(12) United States Patent
Yang et al.

(10) Patent No.: US 11,297,036 B1
(45) Date of Patent: Apr. 5, 2022

(54) SINGLE WHITELISTED INGRESS ENDPOINT ON 1 AND 2 WAY TLS CONNECTIONS

(71) Applicant: Rapid7, Inc., Boston, MA (US)

(72) Inventors: Xi Yang, East York (CA); Paul Miseiko, Mississauga (CA); Bingbin Li, Toronto (CA)

(73) Assignee: Rapid7, Inc., Boston, MA (US)

( * ) Notice: Subject to any disclaimer, the term of this patent is extended or adjusted under 35 U.S.C. 154(b) by 0 days.

(21) Appl. No.: 16/886,972

(22) Filed: May 29, 2020

Related U.S. Application Data

(63) Continuation-in-part of application No. 16/558,485, filed on Sep. 3, 2019, now Pat. No. 11,201,897.

(51) Int. Cl.
*H04L 9/40* (2022.01)
*H04L 29/06* (2006.01)

(52) U.S. Cl.
CPC ........ *H04L 63/0245* (2013.01); *H04L 63/029* (2013.01); *H04L 63/0209* (2013.01); *H04L 63/166* (2013.01)

(58) Field of Classification Search
CPC ............. H04L 63/0245; H04L 63/0209; H04L 63/029; H04L 63/166
USPC ..................... 726/11; 709/202, 224
See application file for complete search history.

(56) References Cited

U.S. PATENT DOCUMENTS

| | | | |
|---|---|---|---|
| 10,015,205 B1 * | 7/2018 | Cohen | H04L 67/02 |
| 10,122,748 B1 * | 11/2018 | Currie | H04L 63/1433 |
| 10,193,864 B2 | 1/2019 | Toy | |
| 10,270,687 B2 * | 4/2019 | Mithyantha | H04L 45/42 |
| 10,348,767 B1 * | 7/2019 | Lee | H04L 63/1416 |
| 10,367,746 B2 * | 7/2019 | Xu | H04L 47/2441 |
| 10,382,401 B1 * | 8/2019 | Lee | H04L 67/143 |
| 10,389,736 B2 * | 8/2019 | Dawes | H04L 63/0227 |
| 10,423,309 B2 * | 9/2019 | Kitchen | H04L 63/02 |
| 10,425,446 B2 * | 9/2019 | Kasbekar | H04L 69/321 |
| 10,430,263 B2 | 10/2019 | Polar Seminario | |
| 10,447,553 B2 * | 10/2019 | Biran | H04L 41/5058 |
| 10,462,057 B1 * | 10/2019 | Kachmarck | H04L 47/122 |
| 10,484,334 B1 * | 11/2019 | Lee | H04L 67/30 |
| 10,492,102 B2 | 11/2019 | Raleigh et al. | |
| 10,496,432 B1 * | 12/2019 | Zhang | G06F 9/5083 |
| 10,523,658 B2 * | 12/2019 | Brouchier | H04L 67/08 |
| 10,542,097 B2 | 1/2020 | Agarwal et al. | |
| 10,616,075 B2 * | 4/2020 | Dawes | H04L 67/125 |
| 10,623,390 B1 | 4/2020 | Rosenhouse | |
| 10,645,172 B1 * | 5/2020 | Hussain | H04L 67/38 |

(Continued)

*Primary Examiner* — Melvin H Pollack
(74) *Attorney, Agent, or Firm* — Ashwin Anand

(57) ABSTRACT

Disclosed herein are methods, systems, and processes for implementing a single whitelisted ingress endpoint on both one-way and two-way Transport Layer Security (TLS) connections and performing load balancing. Both two-way TLS agent-based traffic and one-way TLS non-agent-based traffic is routed through a single whitelisted internet protocol (IP) endpoint. A TLS connection is transmitted from a network load balancer and to a platform gateway service that operates as a Server Name Indication (SNI) reverse proxy server. The platform gateway service separates out the one-way TLS non-agent-based traffic that is part of the TLS connection based on a TLS header of the TLS connection. The one-way TLS non-agent-based traffic is then selectively terminated on an elastic load balancer.

20 Claims, 5 Drawing Sheets

(56) References Cited

U.S. PATENT DOCUMENTS

| | | | |
|---|---|---|---|
| 10,666,666 B1* | 5/2020 | Saurabh | H04L 63/1425 |
| 10,671,726 B1* | 6/2020 | Paithane | H04L 63/1416 |
| 10,680,831 B2* | 6/2020 | Abraham | H04L 9/3263 |
| 10,680,945 B1 | 6/2020 | Ye et al. | |
| 10,708,233 B2 | 7/2020 | Goyal et al. | |
| 10,721,214 B2 | 7/2020 | Bhat et al. | |
| 10,728,288 B2* | 7/2020 | Miriyala | G06F 21/602 |
| 10,742,557 B1* | 8/2020 | Miriyala | H04L 63/0263 |
| 10,750,327 B2* | 8/2020 | Patel | H04W 4/10 |
| 10,771,351 B2 | 9/2020 | Douglas et al. | |
| 10,778,684 B2 | 9/2020 | Gupta et al. | |
| 10,791,118 B2 | 9/2020 | Konda et al. | |
| 10,791,168 B1* | 9/2020 | Dilley | H04L 67/288 |
| 10,805,104 B2 | 10/2020 | Chen et al. | |
| 10,805,352 B2 | 10/2020 | Ithal et al. | |
| 10,826,691 B2* | 11/2020 | Rohel | H04L 63/0428 |
| 10,826,905 B2 | 11/2020 | Gujarathi | |
| 10,826,916 B2* | 11/2020 | Nedbal | H04L 63/0236 |
| 10,831,454 B2* | 11/2020 | Pathak | H04L 67/125 |
| 10,833,949 B2* | 11/2020 | Liguori | G06F 9/4416 |
| 10,841,336 B2 | 11/2020 | Cahana et al. | |
| 10,848,974 B2 | 11/2020 | Bachmutsky et al. | |
| 10,887,380 B2 | 1/2021 | Pahwa et al. | |
| 10,904,342 B2 | 1/2021 | Tollet et al. | |
| 10,911,409 B2 | 2/2021 | Wang et al. | |
| 10,930,157 B2* | 2/2021 | Spector | G01C 21/3407 |
| 10,944,723 B2* | 3/2021 | Ahuja | H04L 63/0263 |
| 10,944,836 B2 | 3/2021 | Olds et al. | |
| 10,951,589 B2 | 3/2021 | Neystadt et al. | |
| 10,958,625 B1 | 3/2021 | Thornewell et al. | |
| 10,958,649 B2* | 3/2021 | Delcourt | G06F 21/554 |
| 10,963,565 B1* | 3/2021 | Xu | G06F 21/55 |
| 10,977,140 B2 | 4/2021 | Hu et al. | |
| 10,997,303 B2 | 5/2021 | Kraft | |
| 11,025,601 B2* | 6/2021 | Arisankala | H04L 67/143 |
| 11,159,569 B2* | 10/2021 | Janakiraman | H04L 12/46 |
| 11,171,950 B1* | 11/2021 | Zhuravlev | H04L 63/0853 |
| 11,184,398 B2* | 11/2021 | Narayanaswamy | H04L 67/20 |
| 11,245,729 B2* | 2/2022 | Monni | H04L 63/0263 |
| 2018/0270257 A1* | 9/2018 | Haelion | G06F 21/14 |
| 2019/0149538 A1 | 5/2019 | Friel et al. | |
| 2019/0245894 A1* | 8/2019 | Epple | H04L 63/1433 |
| 2019/0260599 A1* | 8/2019 | Williams | H04L 63/0209 |
| 2019/0268270 A1* | 8/2019 | Fattah | H04L 47/215 |
| 2019/0312838 A1* | 10/2019 | Grimm | H04L 63/0209 |
| 2019/0312843 A1* | 10/2019 | Grimm | H04L 63/0209 |
| 2019/0318100 A1* | 10/2019 | Bhatia | H04L 63/1425 |
| 2019/0319969 A1* | 10/2019 | Rodniansky | H04L 63/1466 |
| 2019/0325135 A1* | 10/2019 | David | G06F 21/577 |
| 2019/0327135 A1* | 10/2019 | Johnson | H04L 67/34 |
| 2019/0342315 A1* | 11/2019 | Smelov | H04L 63/1425 |
| 2019/0349356 A1* | 11/2019 | McElwee | G06N 20/00 |
| 2019/0349426 A1* | 11/2019 | Smith | H04W 4/08 |
| 2020/0004966 A1* | 1/2020 | Mohinder | G06F 21/57 |
| 2020/0045131 A1* | 2/2020 | Nigam | H04L 43/028 |
| 2020/0057737 A1* | 2/2020 | Chidambaram Nachiappan | G06F 13/4031 |
| 2020/0059492 A1* | 2/2020 | Janakiraman | H04L 63/20 |
| 2020/0065405 A1* | 2/2020 | Gandenberger | G06F 16/215 |
| 2020/0067935 A1* | 2/2020 | Carnes, III | H04L 63/105 |
| 2020/0076902 A1 | 3/2020 | Huang et al. | |
| 2020/0076910 A1* | 3/2020 | Kuperman | H04L 63/0428 |
| 2020/0159776 A1* | 5/2020 | Kitchen | G06F 16/957 |
| 2020/0162432 A1 | 5/2020 | Ludin et al. | |
| 2020/0186600 A1* | 6/2020 | Dawani | H04L 67/1095 |
| 2020/0235990 A1* | 7/2020 | Janakiraman | H04L 12/4641 |
| 2020/0236114 A1 | 7/2020 | Patil et al. | |
| 2020/0314128 A1* | 10/2020 | Hild | G06N 20/00 |
| 2020/0329117 A1* | 10/2020 | Arbatti | H04L 67/10 |
| 2020/0336316 A1* | 10/2020 | Jain | H04L 9/3273 |
| 2020/0366717 A1 | 11/2020 | Chaubey | |
| 2020/0389469 A1* | 12/2020 | Litichever | H04L 63/1425 |
| 2021/0029170 A1* | 1/2021 | Gupta | H04L 63/20 |
| 2021/0067556 A1* | 3/2021 | Tahan | H04L 63/20 |

* cited by examiner

SINGLE WHITELISTED INGRESS ENDPOINT ON 1 AND 2 WAY TLS CONNECTIONS

CROSS-REFERENCE TO RELATED APPLICATIONS

The present application claims the benefit of pending U.S. Utility patent application Ser. No. 16/558,485 titled "Secure Multiplexed Routing" and filed on Sep. 3, 2019, the disclosure of which is incorporated by reference as if set forth in its entirety herein. The present application is a continuation-in-part (CIP) of application Ser. No. 16/558,485.

BACKGROUND

Field of the Disclosure

This disclosure is related is to simplifying networking setup complexity in agent-based cybersecurity computing environments by facilitating a secure single whitelisted ingress endpoint on one-way and two-way transport layer security (TLS) connections.

Description of the Related Art

Modern centralized cloud-based cybersecurity platforms (e.g., cloud platforms) can deploy agents for data collection and analysis (DCA). An agent is lightweight software that can be installed on various supported computing assets in the cloud or on-premises to centralize and monitor data. The agent provides endpoint visibility and detection by collecting live system information (e.g., basic asset identification information, running processes, and logs) from computing assets and sends this data back to the cloud platform for analysis.

Deployments of agents require proper connectivity to function. For example, customers require whitelisting rules to configure on their computing assets so that their corresponding agents can communicate with the cloud platform. Unfortunately, network load balancing (NLB) for transport layer security (TLS) connections associated with a single whitelisted ingress endpoint greatly increases networking setup complexity for customers of the cloud platform.

SUMMARY OF THE DISCLOSURE

Disclosed herein is a single whitelisted ingress endpoint method and system for one-way and two-way transport layer security (TLS) connections. One such method involves routing agent-based network traffic and non-agent-based network traffic through a single whitelisted internet protocol (IP) endpoint, separating out the non-agent-based network traffic, and terminating the non-agent-based network traffic on an elastic load balancer.

In one embodiment, the agent-based network traffic represents two-way TLS traffic associated with a TLS connection. In another embodiment, the non-agent-based network traffic represents one-way TLS traffic associated with the TLS connection.

In some embodiments, separating out the one-way TLS traffic includes tunneling the TLS connection from a network load balancer to a reverse proxy based on one or more server name indication (SNI) fields in a TLS header of the TLS connection. In other embodiments, the method involves determining whether a service routed to the network load balancer is the one-way TLS traffic or the two-way TLS traffic based on the TLS header.

In certain embodiments, the TLS connection is a multiplexed TLS connection that includes the one-way TLS traffic and the two-way TLS traffic. In this example, the one-way TLS traffic and the two-way TLS traffic share the TLS header.

In one embodiment, the method involves terminating the two-way TLS traffic terminates on one or more server instances and terminating the one-way TLS traffic on the elastic load balancer. In another embodiment, the method involves decrypting a request for the service and forwarding the decrypted request for the service to one or more server instances.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

Figure 1:
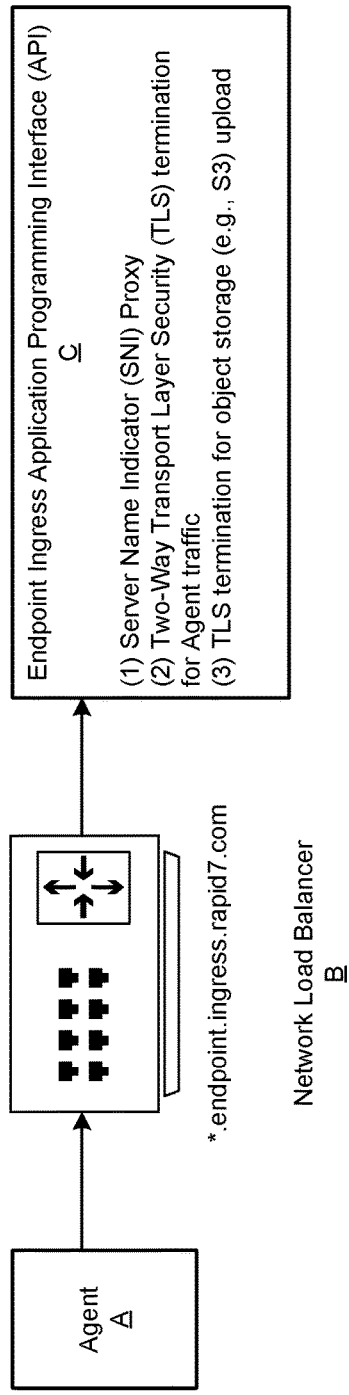
FIG. 1 is a block diagram 100 of an existing and/or traditional implementation of a whitelisted ingress endpoint and is prior art.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Modern centralized cloud-based cybersecurity platforms (e.g., a cloud platform like the Insight Platform provided by Rapid7®, Inc. of Boston, Mass.) can deploy agents for data collection and analysis (DCA) purposes. An agent is lightweight software that can be installed on various supported computing assets in the cloud or on-premises to centralize and monitor data. The agent provides endpoint visibility and detection by collecting live system information (e.g., computing asset identification information, running processes, and logs) from computing assets and sends this data back to the cloud platform for analysis.

As noted, deployments of agents require proper connectivity to function. For example, customers require whitelisting rules to configure on their computing assets so that their corresponding agents can communicate with the cloud platform. Unfortunately, also as noted, network load balancing (NLB) on transport layer security (TLS) connections greatly increases networking setup complexity for customers of the cloud platform. For example, customers of the cloud platform described above (and other comparable cloud platforms) often require at least the following three technical steps, which must happen in tandem: (1) a single internet protocol (IP) port whitelisting rule for the customer to setup that does not need changes or updates, (2) handling of both one-way and two-way transport layer security (TLS) connections, and (3) termination of the one-way TLS connection on a load balancer (e.g., for cost efficiency).

First, it is extremely cumbersome and resource and cost prohibitive to require customers of the cloud platform described above (and other comparable cloud platforms) to use multiple whitelisting rules and/or to require customers to change and/or update existing whitelisting rules. Customers typically prefer using a single whitelisting rule (that will not need to be changed and/or updated) to receive and route data from multiple endpoints (e.g., to/from multiple vendors, cloud storage providers, agents, and the like) because doing so greatly simplifies networking setup complexity and reduces computing resource consumption. Using a single whitelisting rule in a centralized cloud cybersecurity computing environment means adopting the single whitelisting rule to be readily applicable to various disparate endpoint destinations (e.g., in the cloud such as Amazon® S3) and data collection destinations (e.g., agents).

Second, the cloud platform must be able to handle both one-way and two-way TLS connections. TLS and its predecessor, SSL (secure sockets layer), are cryptographic protocols to facilitate communication security (e.g., confidentiality, integrity, non-repudiation, and the like), over a network. In one-way TLS, a server certificate is created by a certificate authority (CA) that a client can trust when the clients wants to connect to a server. A server can be configured to allow connections from any client (e.g., like in one-way TLS) or the server can be configured to request authentication from any client that attempts to connect to the server. In two-way TLS authentication, a client certificate is involved in addition to the server certificate for bolstering the authentication process. Just like a server certificate, a client certificate includes basic information about the client's identity, a public key of the client, and a digital signature of a CA.

Certain applications use one-way TLS and others require two-way TLS. For example, accessing an electronic mail service (e.g., Gmail) uses one-way TLS (e.g., by the use of a password for login). Two-way TLS connections are preferred in scenarios where a server is configured to only accept TLS connections from a limited group of permitted clients (e.g., when a customer wants to limit TLS connections to a server to certain vendors or partners). Whitelisting alone is not a good security practice, as the IP can be spoofed. Therefore, two-way TLS in addition to a single whitelisting rule is a preferred implementation mechanism for many customers.

In the cloud platform disclosed and described herein, one-way TLS traffic can include several external endpoints routinely encountered (and required) by the cloud platform (e.g., hypertext transfer protocol (HTTP) traffic, connections to cloud-based object storage such as S3, and the like). On the other hand, agent-based traffic requires two-way TLS connections given the highly sensitive and confidential nature of agent-collected data (e.g., data in the cybersecurity realm such as user information, asset identity, running processes, log data, and the like). Therefore, the cloud platform must be configured to route both one-way and two-way TLS connections.

Third, the cloud platform must be able to perform load balancing (e.g., for cost efficiency purposes). For example, in addition to implementing a network load balancer that distributes incoming one-way and two-way TLS traffic across multiple targets, the cloud platform must be able to selectively terminate only the one-way TLS connection on a different load balancer (e.g., an elastic load balancer for the one-way TLS connection).

Disclosed herein are methods, systems, and processes that securely facilitate the provision and configuration of a single whitelisted ingress endpoint on both one-way and two-way TLS connections that at least: (a) uses a single whitelisting rule (that does not need changes/updates), (b) handles both one-way and two-way TLS connections, and (c) selectively terminates the one-way TLS connection on a load balancer for cost efficiency.

Example of Existing Ingress Endpoint Implementation(s)

FIG. 1 is a block diagram 100 of an existing implementation of a whitelisted ingress endpoint. In existing and/or traditional implementations of a whitelist ingress endpoint, a service request received by (or routed to) network load balancer B from a target data source (e.g., Agent A) is shown as transfer control protocol (TCP) endpoint.ingress.rapid7.com in FIG. 1. An endpoint ingress application programming interface (API) C, as shown in FIG. 1, currently handles: (1) the server name indication (SNI) proxy, (2) two-way TLS termination for agent traffic, and (3) TLS termination for object storage upload (e.g., S3).

Unfortunately, the existing implementation depicted in FIG. 1 (and another similar and/or comparable implementation) requires at least: (1) multiple whitelisting rules (e.g., one whitelisting rule for two-way TLS agent traffic and another whitelisting rule for one-way TLS S3 traffic), (2) cannot simultaneously handle both one-way and two-way TLS connections (e.g., for selective load balancing purposes), and (3) is unable to selectively terminate just the one-way TLS on a load balancer for cost efficiency (e.g., at least because of the inability to identify and segregate one-way and two-way TLS connections in a multiplexed TLS connection).

Example Platform Gateway Service for Single Whitelisted Ingress Endpoint

Figure 2:
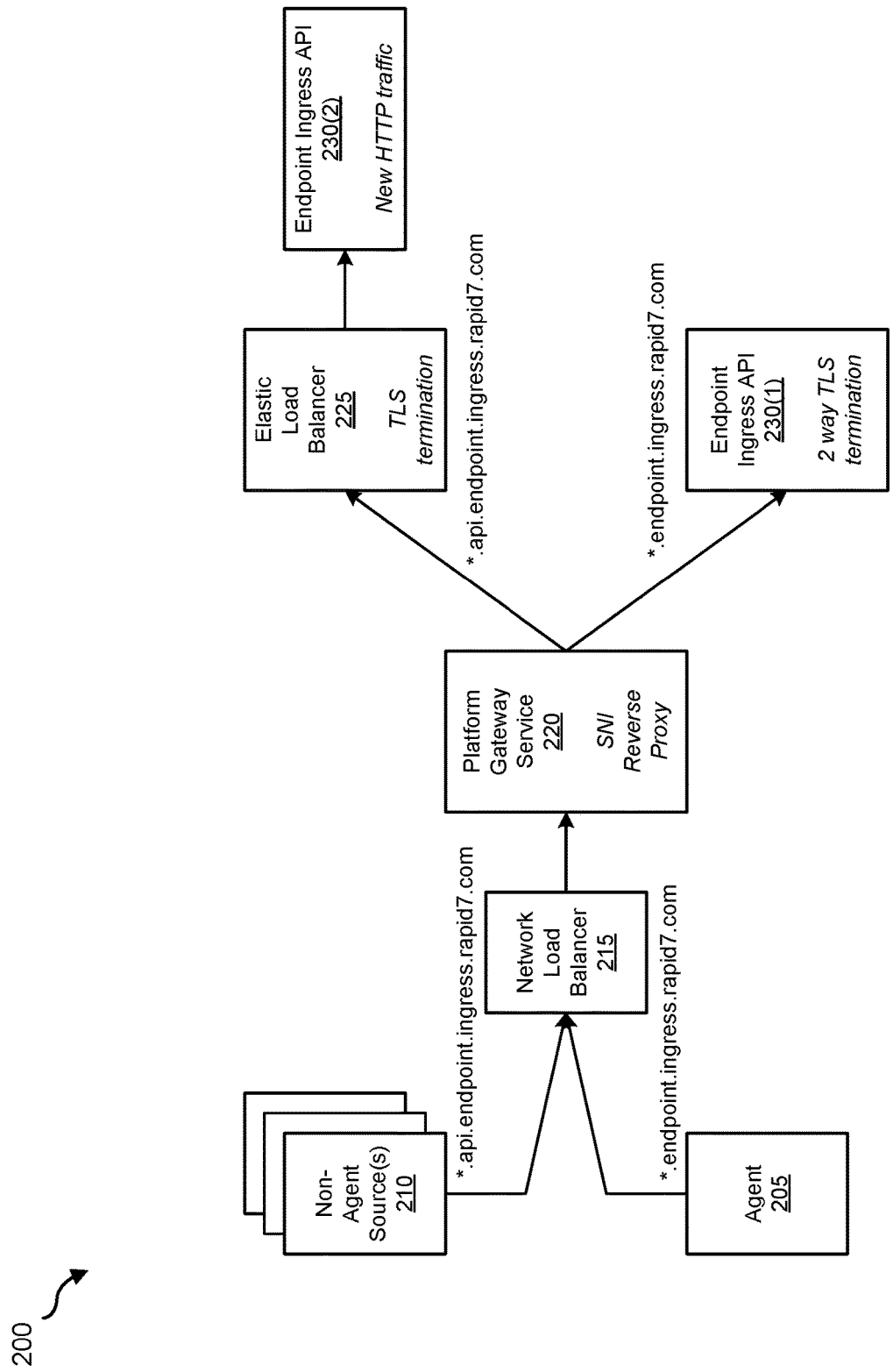
FIG. 2 is a block diagram 200 of a single whitelisted ingress endpoint implemented on one-way and two-way transport layer security (TLS) connections, according to one embodiment of the present disclosure.

FIG. 2 is a block diagram 200 of a single whitelisted ingress endpoint implemented on one-way and two-way TLS connections, according to one embodiment. Internet/TCP target service destinations that are routed are indicated as endpoint.ingress.rapid.com for agent 205 and api.endpoint.ingress.rapid7.com for non-agent source(s) 210 (e.g., S3 and other vendors). In one embodiment, platform gateway service 220 configures network load balancer 215 to implement SNI routing techniques to multiplex multiple platform services (e.g., agent 205 and non-agent sources 210) via a single routing service (as disclosed in application Ser. No. 16/558,485).

SNI is a header in the TLS protocol (e.g., a TLS header) that permits a TLS request to specify a desired host's name. This enables a server to host several websites or services on the same network address or port. As noted, customers are inconvenienced when required by the cloud platform to reconfigure their whitelisting rules or use multiple whitelisting rules (e.g., as part of a firewall as discussed with respect to application Ser. No. 16/558,485). Therefore, to later segregate or separate out one-way TLS traffic for selective termination, the system of FIG. 1 includes network load balancer 215, a platform gateway service 220 that acts as a SNI reverse proxy, an elastic load balancer 225 (for one-way TLS termination), and endpoint ingress APIs (e.g., various server instances for new HTTP traffic and two-way TLS termination).

In one embodiment, a request from agent 205 (e.g., agent-based network traffic) and non-agent source(s) 210 (e.g., non-agent-based network traffic) is routed to network load balancer 215 using a single whitelisting rule. For example, in order for the customer to be able to use just a single whitelisting rule, a domain name system (DNS) record is used to route both agent-based network traffic and non-agent-based network traffic to network load balancer 215. As described in application Ser. No. 16/558,485, the two-way TLS agent-based network traffic and the one-way TLS non-agent-based network traffic can be multiplexed and transmitted to platform gateway service 220 from network load balancer 215 (as shown in FIG. 2).

In certain embodiments, platform gateway service 220 separates out (or segregates) the non-agent-based network traffic (e.g., the one-way TLS traffic) from the agent-based network traffic (e.g., the two-way TLS traffic). Because agent 205 is managed by platform gateway service 220, platform gateway service 220 can analyze a TLS header in the routed TLS connection to determine which portion of the TLS connection is one-way TLS traffic and which portion of the TLS connection is two-way TLS traffic. For example, platform gateway service 220 separates out the one-way TLS traffic by tunneling (e.g., using a tunneling protocol) the TLS connection from network load balancer 215 to an SNI reverse proxy (e.g., provided by platform gateway service 220) based on one or more SNI fields in a TLS header of the TLS connection. Therefore, because platform gateway service 220 acts as a SNI reverse proxy, platform gateway service 220 can determine whether a service routed to network load balancer 215 is one-way TLS traffic or two-way TLS traffic based on the TLS header of the (multiplexed) TLS connection (where the TLS header is shared by both the one-way and two-way TLS connections).

Finally, in some embodiments, once separated out, segregated, or separately identified by gateway platform service 220, the one-way TLS traffic (e.g., the non-agent-based network traffic) is terminated on elastic load balancer 225. In other embodiments, the two-way TLS traffic (e.g., the agent-based network traffic) is terminated on endpoint ingress API 230(1) and endpoint ingress API 230(2) accepts new HTTP traffic. For example, the two-way TLS traffic is terminated on one or more server instances, the one-way TLS traffic is terminated on elastic load balancer 225, and a request for the service is decrypted and forwarded to one or more server instances.

Example Command and Control Mechanism for Ingress Endpoint(s)

Figure 3:
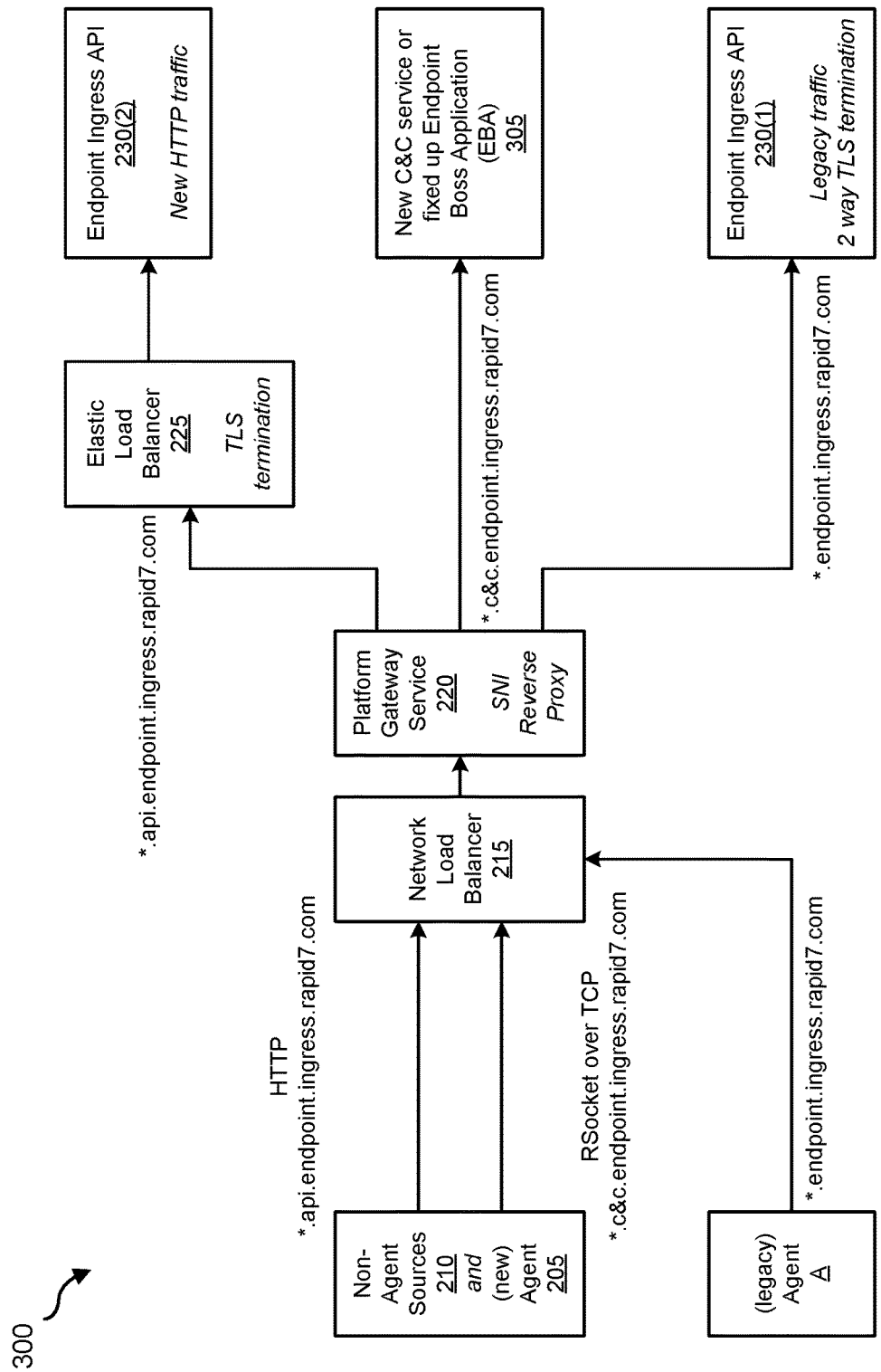
FIG. 3 is a block diagram 300 of the system of FIG. 2 augmented with a command and control mechanism, according to one embodiment of the present disclosure.

FIG. 3 is a block diagram 300 of the system of FIG. 2 augmented with a command and control mechanism for endpoints, according to one embodiment. As shown in FIG. 3, both one-way TLS traffic (e.g., from (new) agent 205 that is an endpoint with a built-in command and control mechanism (that does away with the need for two-way TLS in agent deployments) and non-agent sources 210) and two-way TLS traffic (e.g., from (legacy) agent A) is routed to network load balancer 215. Next, a multiplexed TLS connection (with one-way and two-way TLS connections from the aforementioned endpoints) is received by platform gateway service 220, which functions as a SNI reverse proxy (e.g., by tunneling the TLS connection to downstream services like a reverse proxy).

Platform gateway service 220 identifies and separates out the various one-way and two-way TLS connections in the multiplexed TLS connection based on at least a TLS header that is shared by the three TLS connections shown in FIG. 3. The one-way TLS traffic from non-agent sources 210 endpoint is terminated at elastic load balancer 225, TLS traffic (one-way or two-way) from (new) agent 205 is handled by a new command and control service or a re-configured endpoint boss application (EBA), and the two-way TLS traffic from (legacy) agent A endpoint is terminated by endpoint ingress API 230(1) (e.g., legacy traffic two-way TLS termination).

The network design(s) illustrated in FIGS. 2 and 3 include multiple load balancers (e.g., network load balancer 215 and elastic load balancer 225) that work together seamlessly to enable the cloud platform to expose various platform services (e.g., agent-based and non-agent-based endpoints) for both one-way and two-way TLS connections through a single IP endpoint for customers to whitelist, thus greatly simplifying networking setup complexity.

As noted, currently it is not possible to satisfy all three technical requirements of a single whitelisted IP endpoint, one-way and two-way TLS connection handling, and selective termination of one-way TLS traffic on a load balancer. By leveraging systems, methods, and processes for "Secure Multiplexed Routing" disclosed in application Ser. No. 16/558,485 along with the identification/determination of which endpoint services are one-way or two-way TLS connections, the systems and methods disclosed herein can identify and separate disparate TLS connections accordingly as well as terminate two-way TLS connections on server instances and terminate one-way TLS connections on load balancers (which can then forward the decrypted requests to the server instances (e.g., endpoint ingress APIs)).

Example Process to Implement a Platform Gateway Service

Figure 4:
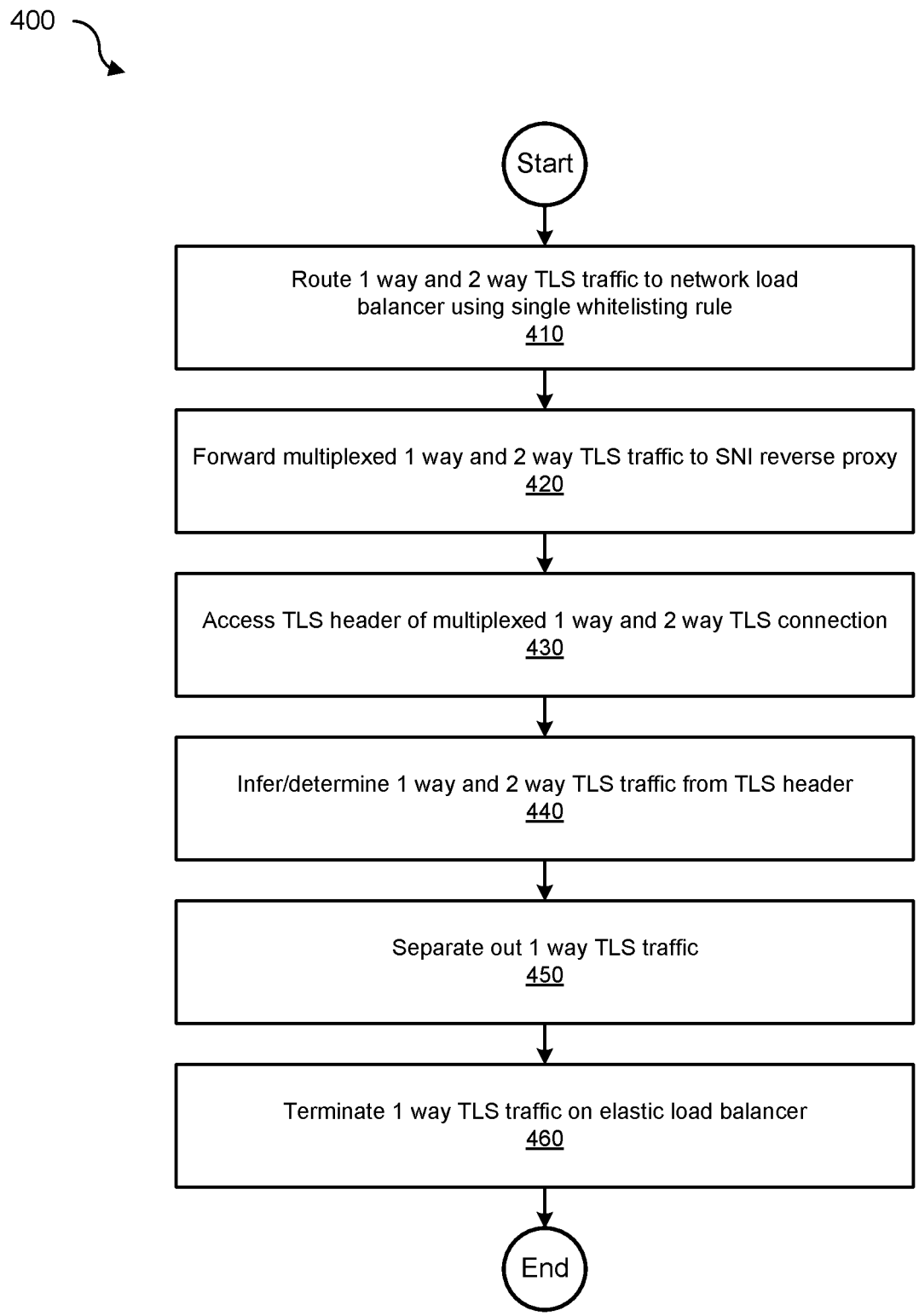
FIG. 4 is a flowchart 400 of a process for securely implementing a single whitelisted ingress endpoint on one-way and two-way TLS connections, according to one embodiment of the present disclosure.

FIG. 4 is a flowchart 400 of a process for securely implementing a single whitelisted ingress endpoint on one-way and two-way TLS connections, according to one embodiment. The process begins at 410 by routing one-way and two-way TLS traffic to a network load balancer (e.g., network load balancer 215) using a single whitelisting rule, thus enabling the exposure of both one-way and two-way platform services (e.g., agent endpoint traffic and non-agent endpoint traffic) through a single IP endpoint for customers to whitelist (e.g., network load balancer 215 and/or platform gateway service 220—in some embodiments, platform gateway service 220 can include network load balancer 215). At 420, the process forwards the multiplexed one-way and two-way TLS traffic to a SNI reverse proxy as a single TLS connection (e.g., platform gateway service 220). At 430, the process accesses a TLS header of the TLS connection that includes both the one-way and two-way TLS traffic (e.g., a shared TLS header).

At 440, the process infers and/or determines the one-way and two-way TLS traffic from the (shared) TLS header. For example, because agent 205 is managed by the same cloud platform that also manages platform gateway service 220, the SNI reverse proxy can determine which portion of the multiplexed TLS connection is one-way TLS traffic and which portion of the multiplexed TLS is two-way TLS traffic. At 450, the process separates out the one-way TLS traffic (from the single TLS connection). In some embodiments, the TLS connection can be demultiplexed by platform gateway service 220. The process ends at 460 by terminating the one-way TLS traffic on an elastic load balancer (e.g., elastic load balancer 225).

Example Computing and Networking Environment

Figure 5:
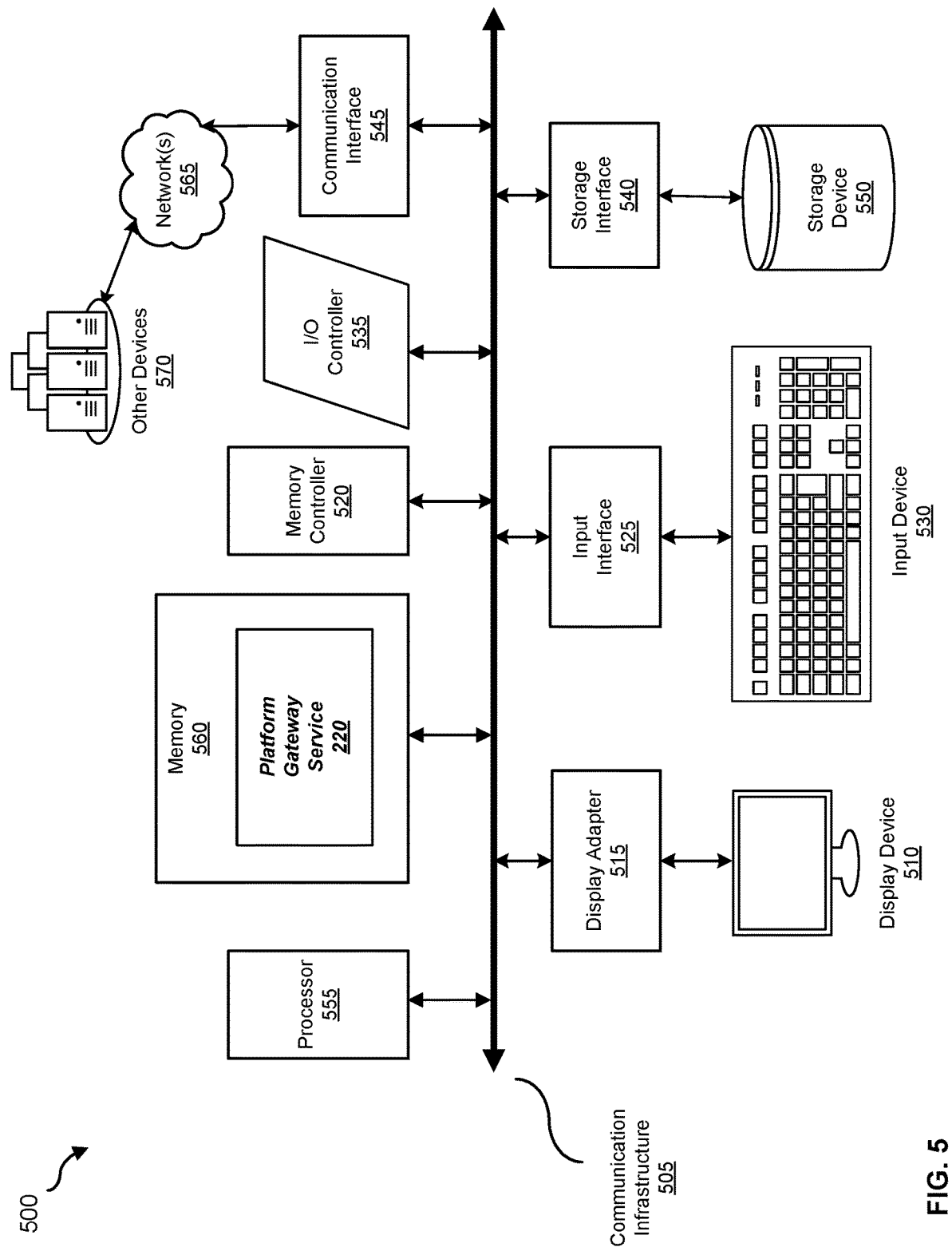
FIG. 5 is a block diagram 500 of a computing system and networking environment, illustrating how a platform gateway service for load balancing can be implemented in software, according to one embodiment of the present disclosure.

FIG. 5 is a block diagram 500 of a computing and networking system, illustrating how the systems described in FIGS. 2 and 3 (e.g., platform gateway service 220, among other components) can be implemented in software, according to one embodiment. Computing system 500 can include the various components illustrated in FIGS. 2 and 3 and broadly represents any single or multi-processor computing device or system capable of executing computer-readable instructions. Examples of computing system 500 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 500 may include at least one processor 555 and a memory 560. By executing the software that executes platform gateway service 220 and one or more other components illustrated in FIGS. 2 and 3, computing system 500 becomes a special purpose computing device that is configured to facilitate a single whitelisted ingress endpoint on one-way and two-way TLS connections.

Processor 555 generally represents any type or form of processing unit capable of processing data or interpreting and executing instructions. In certain embodiments, processor 555 may receive instructions from a software application or module. These instructions may cause processor 555 to perform the functions of one or more of the embodiments described and/or illustrated herein. For example, processor 555 may perform and/or be a means for performing all or some of the operations described herein. Processor 555 may also perform and/or be a means for performing any other operations, methods, or processes described and/or illustrated herein.

Memory 560 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 500 may include both a volatile memory unit and a non-volatile storage device. In one example, program instructions implementing platform gateway service 220 and one or more other components illustrated in FIGS. 2 and 3 may be loaded into memory 560.

In certain embodiments, computing system 500 may also include one or more components or elements in addition to processor 555 and/or memory 560. For example, as illustrated in FIG. 5, computing system 500 may include a memory controller 520, an Input/Output (I/O) controller 835, and a communication interface 545, each of which may be interconnected via a communication infrastructure 505. Communication infrastructure 505 generally represents any type or form of infrastructure capable of facilitating communication between one or more components of a computing device. Examples of communication infrastructure 505 include, without limitation, a communication bus (such as an Industry Standard Architecture (ISA), Peripheral Component Interconnect (PCI), PCI express (PCIe), or similar bus) and a network.

Memory controller 520 generally represents any type/form of device capable of handling memory or data or controlling communication between one or more components of computing system 500. In certain embodiments memory controller 520 may control communication between processor 555, memory 560, and I/O controller 835 via communication infrastructure 505. In certain embodiments, memory controller 520 may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 500, such as processor 555, memory 560, communication interface 545, display adapter 515, input interface 525, and storage interface 540.

Communication interface 545 broadly represents any type/form of communication device/adapter capable of facilitating communication between computing system 500 and other devices and may facilitate communication between computing system 500 and a private or public network. Examples of communication interface 545 include, a wired network interface (e.g., network interface card), a wireless network interface (e.g., a wireless network interface card), a modem, and any other suitable interface. Communication interface 545 may provide a direct connection to a remote server via a direct link to a network, such as the Internet, and may also indirectly provide such a connection through, for example, a local area network. Communication interface 545 may also represent a host adapter configured to facilitate communication between computing system 500 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 500 may also include at least one display device 510 coupled to communication infrastructure 505 via a display adapter 515 that generally represents any type or form of device capable of visually displaying information forwarded by display adapter 515. Display adapter 515 generally represents any type or form of device configured to forward graphics, text, and other data from communication infrastructure 505 (or from a frame buffer, as known in the art) for display on display device 510. Computing system 500 may also include at least one input device 530 coupled to communication infrastructure 505 via an input interface 525. Input device 530 generally represents any type or form of input device capable of providing input, either computer or human generated, to computing system 500. Examples of input device 530 include a keyboard, a pointing device, a speech recognition device, or any other input device.

Computing system 500 may also include storage device 550 coupled to communication infrastructure 505 via a storage interface 540. Storage device 550 generally represents any type or form of storage devices or mediums capable of storing data and/or other computer-readable instructions. For example, storage device 550 may include a magnetic disk drive (e.g., a so-called hard drive), a floppy disk drive, a magnetic tape drive, an optical disk drive, a flash drive, or the like. Storage interface 540 generally represents any type or form of interface or device for transmitting data between storage device 550, and other components of computing system 500. Storage device 550 may be configured to read from and/or write to a removable storage unit configured to store computer software, data, or other computer-readable information. Examples of suitable removable storage units include a floppy disk, a magnetic tape, an optical disk, a flash memory device, or the like. Storage device 550 may also include other similar structures or devices for allowing computer software, data, or other computer-readable instructions to be loaded into computing system 500. For example, storage device 550 may be configured to read and write software, data, or other computer-readable information. Storage device 550 may also be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from that shown in FIG. 5. Computing system 500 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The computer-readable medium containing the computer program may be loaded into computing system 500. All or a portion of the computer program stored on the computer-readable medium may then be stored in memory 560, and/or various portions of storage device 550. When executed by processor 555, a computer program loaded into computing system 500 may cause processor 555 to perform and/or be a means for performing the functions of one or more of the embodiments described/illustrated herein. Alternatively, one or more of the embodiments described and/or illustrated herein may be implemented in firmware and/or hardware.

Network(s) 565 generally represents any type or form of computer networks or architectures capable of facilitating communication between the systems of FIGS. 2 and 3 and other devices 570, including agent 205 and non-agent sources 210. For example, network 565 can be a Wide Area Network (WAN) (e.g., the Internet) or a Local Area Network (LAN). In certain embodiments, a communication interface, such as communication interface 545 in FIG. 5, may be used to provide connectivity between various endpoints (agent and non-agent), the various components of the computing systems of FIGS. 2 and 3 (e.g., the disparate load balancers, SNI reverse proxy, endpoint ingress APIs of one or more server instances, endpoint boss application), and network 140. The embodiments described and/or illustrated herein are not limited to the Internet or any particular network-based environment.

In some examples, all or a portion of the systems and components illustrated in FIGS. 2 and 3 (e.g., the disparate load balancers, SNI reverse proxy, endpoint ingress APIs of one or more server instances, endpoint boss application, command and control system, and the like) may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, platform gateway service 220 may transform the behavior of computing system 500 to perform selective load balancing for a single whitelisted ingress endpoint on both one-way and two-way TLS connections.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:
1. A computer-implemented method, comprising:
routing agent-based network traffic and non-agent-based network traffic from a network through a single whitelisted internet protocol (IP) endpoint,
wherein
the IP endpoint is implemented by a platform gateway service of a cloud-based cybersecurity platform monitoring the network;
performing, by the platform gateway service:
separating the agent-based network traffic and the non-agent-based network traffic;
terminating the non-agent-based network traffic on an elastic load balancer of the cybersecurity platform; and
terminating the agent-based network traffic on one or more server instances of the cybersecurity platform that implements an ingress API for the agent-based network traffic.
2. The computer-implemented method of claim 1, wherein
the agent-based network traffic represents two-way transport layer security (TLS) traffic associated with a TLS connection.
3. The computer-implemented method of claim 2, wherein
the non-agent-based network traffic represents one-way TLS traffic associated with the TLS connection.
4. The computer-implemented method of claim 3, wherein
separating out the one-way TLS traffic comprises:
tunneling the TLS connection from a network load balancer to a reverse proxy based on one or more server name indication (SNI) fields in a TLS header of the TLS connection.
5. The computer-implemented method of claim 4, further comprising:

determining whether a service routed to the network load balancer is the one-way TLS traffic or the two-way TLS traffic based on the TLS header.

6. The computer-implemented method of claim of claim 5, wherein
the TLS connection is a multiplexed TLS connection,
the multiplexed TLS connection comprises the one-way TLS traffic and the two-way TLS traffic, and
the one-way TLS traffic and the two-way TLS traffic share the TLS header.

7. The computer-implemented method of claim 6, further comprising:
terminating the two-way TLS traffic on the one or more server instances; and
terminating the one-way TLS traffic on the elastic load balancer.

8. The computer-implemented method of claim 6, further comprising:
decrypting a request for the service; and
forwarding the decrypted request for the service to the one or more server instances.

9. A non-transitory computer readable storage medium comprising program instructions executable to implement a platform gateway service of a cloud-based cybersecurity platform and cause the platform gateway service to:
receive agent-based network traffic and non-agent-based network traffic routed from a network through a single whitelisted internet protocol (IP) endpoint implemented by the platform gateway service;
separate the agent-based network traffic and the non-agent-based network traffic;
terminate the non-agent-based network traffic on an elastic load balancer of the cybersecurity platform; and
terminate the agent-based network traffic on one or more server instances of the cybersecurity platform that implements an ingress API for the agent-based network traffic.

10. The non-transitory computer readable storage medium of claim 9, wherein
the agent-based network traffic represents two-way transport layer security (TLS) traffic associated with a TLS connection, and
the non-agent-based network traffic represents one-way TLS traffic associated with the TLS connection.

11. The non-transitory computer readable storage medium of claim 10, wherein
separating out the one-way TLS traffic comprises:
tunneling the TLS connection from a network load balancer to a reverse proxy based on one or more server name indication (SM) fields in a TLS header of the TLS connection.

12. The non-transitory computer readable storage medium of claim 11, further comprising:
determining whether a service routed to the network load balancer is the one-way TLS traffic or the two-way TLS traffic based on the TLS header.

13. The non-transitory computer readable storage medium of claim 12, wherein
the TLS connection is a multiplexed TLS connection,
the multiplexed TLS connection comprises the one-way TLS traffic and the two-way TLS traffic, and
the one-way TLS traffic and the two-way TLS traffic share the TLS header.

14. The non-transitory computer readable storage medium of claim 13, further comprising:
terminating the two-way TLS traffic on the one or more server instances,
terminating the one-way TLS traffic on the elastic load balancer;
decrypting a request for the service; and
forwarding the decrypted request for the service to the one or more server instances.

15. A system comprising:
one or more processors; and
a memory coupled to the one or more processors, wherein the memory stores program instructions executable by the one or more processors to:
receive agent-based network traffic and non-agent-based network traffic routed from a network through a single whitelisted internet protocol (IP) endpoint implemented by a platform gateway service of a cloud-based cybersecurity platform monitoring the network;
cause the platform gateway service to:
separate the agent-based network traffic and the non-agent-based network traffic;
terminate the non-agent-based network traffic on an elastic load balancer of the cybersecurity platform; and
terminate the agent-based network traffic on one or more server instances of the cybersecurity platform that implements an ingress API for the agent-based network traffic.

16. The system of claim 15, wherein
the agent-based network traffic represents two-way transport layer security (TLS) traffic associated with a TLS connection, and
the non-agent-based network traffic represents one-way TLS traffic associated with the TLS connection.

17. The system of claim 16, wherein
separating out the one-way TLS traffic comprises tunneling the TLS connection from a network load balancer to a reverse proxy based on one or more server name indication (SNI) fields in a TLS header of the TLS connection.

18. The system of claim 17, further comprising:
determining whether a service routed to the network load balancer is the one-way TLS traffic or the two-way TLS traffic based on the TLS header.

19. The system of claim 18, wherein
the TLS connection is a multiplexed TLS connection,
the multiplexed TLS connection comprises the one-way TLS traffic and the two-way TLS traffic, and
the one-way TLS traffic and the two-way TLS traffic share the TLS header.

20. The system of claim 19, further comprising:
terminating the two-way TLS traffic on the one or more server instances,
terminating the one-way TLS traffic on the elastic load balancer;
decrypting a request for the service; and
forwarding the decrypted request for the service to the one or more server instances.

* * * * *